Nov. 3, 1931.  W. V. D. KELLEY  1,830,468

COLOR PHOTOGRAPHY

Filed Nov. 12, 1929

Inventor;
William V. D. Kelley,
per Arthur J. Farnsworth.
Attorney.

Patented Nov. 3, 1931

1,830,468

UNITED STATES PATENT OFFICE

WILLIAM V. D. KELLEY, OF LOS ANGELES, CALIFORNIA

COLOR-PHOTOGRAPHY

Application filed November 12, 1929. Serial No. 406,624.

In this specification, and the accompanying drawings, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to the art of color cinematography, and among its principal objects are; first, to provide means whereby, after first producing two or more color-selection negatives in black and white values, prints from these negatives may be projected concurrently with the aid of color filters or color-toning, to produce a colored motion picture; second, to provide an improved method of producing colored cinematographs, wherein the color effects are secured independently of the picture qualities, so that the finest attainable results in the field of black and white photography may be available to the cinematographer, in combination with true color values, all the delicate shadings of the black and white picture being fully preserved; and, third, to accomplish the above, and other objects that will appear from the following description, in a simple, practical, and eminently satisfactory manner.

The accompanying drawings illustrate diagrammatically the methods by which my various objects are attained. In these:—

Similar reference numerals refer to similar parts throughout the several views.

This invention comprises a method of combining lights of pure colors, and lights of composite colors produced by mixing the pure colored lights, in connection with the projection of an uncolored motion picture film, in such a manner as to secure a naturally colored cinematograph effect. It is only useful in connection with pictures in motion, as in the case of colored motion pictures. The arrangement of the colors alone, while in a sense pictorial, discloses no gradations of density to produce the effects of shading, and does not produce blacks. For certain purposes this feature is useful.

Figure 1:
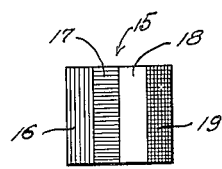
Figure 1 represents the colored object to be photographed, in elevation.

In the following description it will first be assumed, for the sake of simplicity, that the object to be photographed is a simple rectangular card as indicated at 15 in Fig. 1, and that this has vertical stripes of different colors thereon. On this card the area 16 is colored red, area 17 is colored blue-green, area 18 is white, and area 19 is black.

The first step in the process is to produce two color-selection negatives of this card, that are substantially complementary. This may be accomplished by means of any suitable apparatus, as by the method described in my co-pending application for color-photography filed April 9, 1929, Serial No. 353,711. If use of this method is made, the two negatives may be produced on two emulsions on the same base; one of these being sensitized for yellow, green, and blue; and the other being pan-chromatic, and having the greens and blues eliminated by means of an interposed filter. However the negatives may be produced, we will herein consider them as being separate, for convenience and clarity of description. The red or pan-chromatic negative of object 15 is shown at 20 in Fig. 2. Its areas 21 and 22, corresponding to red-area 16 and white area 18 of the object respectively, have been exposed. Area 23 is unexposed, since this corresponds to the blue-green area 17 of the object, and the light of this color has been cut off by a color filter during the exposure of this negative. Area 24 is unexposed, since the corresponding area 19 of the object is black.

Figure 3:
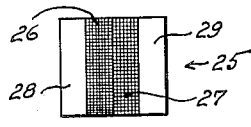
Figure 3 is a negative photograph of the object on an ortho-chromatic film, the reds having been eliminated by means of a color filter.

The blue-green or ortho-chromatic negative is shown at 25 in Fig. 3. In this, area 26 corresponds to the blue-green area 17 of the object, and has been exposed, the emulsion being sensitive to this color. Area 27, corresponding to white area 18 of the object, has also been exposed. The other two areas, 28 and 29, remain unexposed, since neither the red nor the black areas of the object are effective upon this emulsion.

Figure 4:
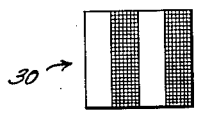
Figure 4 is a positive print of the film shown in Fig. 2.
Figure 5:
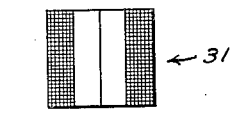
Figure 5 is a positive print of the film shown in Fig. 3.

From the red, or pan-chromatic, negative 20, a positive print 30 is made, as shown in Fig. 4; and from the blue-green, or ortho-chromatic negative 25, a positive print 31 is made, as shown in Fig. 5.

Figure 6:
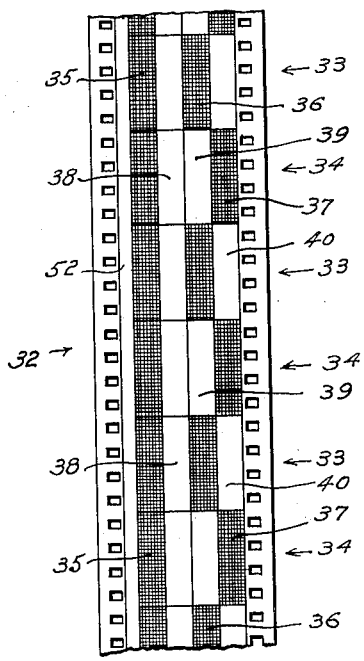
Figure 6 is a "dupe" negative made by printing the positive of Fig. 4 in alternate frames, and the negative of Fig. 3 in the other frames.

A "dupe" negative on a motion picture film, shown in Fig. 6 at 32, is next made. This is the preferred way of working, although other methods are available and will be mentioned. To produce this dupe, its alternate frames 33 are printed from a positive film made from negative 20, of which the prototype is shown at 30 in Fig. 4. This is accomplished in a suitable alternating printer, in well known ways.

The alternate frames 34 of dupe 32 are then printed from the negative film of which the prototype is shown at 25.

It will be noticed that, in all of the frames of the thus prepared film 32, the spaces 35, that correspond to the red area 16 of the original object, have been exposed, so that the red of the original object is represented by a deposit of black silver. It will also be noticed that the areas 36, that correspond to white areas 18 of the object, and areas 37, that correspond to black areas 19 of the object, are staggered in arrangement, and are represented by deposits of reduced silver. The remaining spaces 38, 39, and 40 of film 32 are clear. Thus clear areas 38 correspond to blue-green area 17 of the object. Clear areas 39 correspond to white area 18 of the object, and clear areas 40 correspond to black area 19 of the object.

The film strip shown in Fig. 6 is next treated in a toning solution, adapted to convert the reduced silver to a red color without effect upon the clear spaces; and the succeeding step is to treat it so as to tint the clear spaces blue-green, without effect upon the red spaces. These treatments will be explained in detail below.

Figure 7:
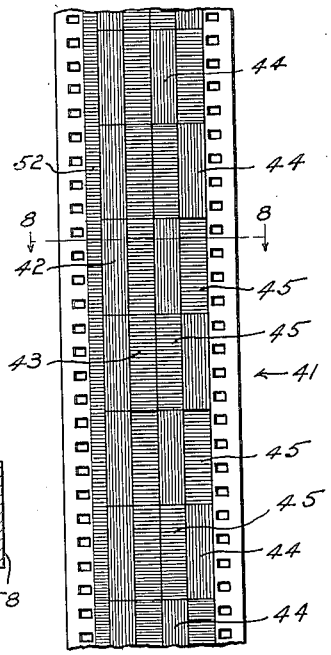
Figure 7 represents the film shown in Fig. 6, after it has been chemically treated and colored.

We now have produced a film colored as shown at 41, in Fig. 7. In this film the left-hand vertical row of areas 42 are colored red, as in the original object. The vertical row of areas 43 is also correspondingly colored blue-green. The other two vertical rows are each composed of alternate red and blue-green areas, the red areas of these rows being designated 44, and the blue-green areas 45.

Figure 8:
Figure 8 is a cross-section of the film of Fig. 7, taken on the line 8—8 of the latter figure, and upon which a positive black and white photograph of the object has been superposed.

Upon projection of this colored film 41, the two right-hand rows of alternate red and blue-green areas will appear as white, due to the additive effect of these complementary colors. If now we superpose upon film 41 a black and white image of the object, with its black to white gradations of shading, we shall have upon projection a properly and naturally colored picture of the object, including all of its shadings and colors. Such a composite film is shown in cross-section in Fig. 8, wherein: a transparent base is shown at 46; the film layer corresponding to film 41, sectioned on the line 8—8 of Fig. 7, being indicated at 47; and the film layer 48 representing a black and white positive image of the object in its natural gradations of shading from white to black.

The treatment of film 32 to produce the effects shown in film 41 may be accomplished in the manner set forth in my co-pending application for color-photography filed on April 24, 1929, Ser. No. 357,702. The film is first bleached in a bath composed of potassium bichromate 8 grammes, cupric chloride 24 grammes, sodium chloride 80 grammes, and water 1 liter. This bath has the effect of bleaching the reduced silver of the film, and hardens the gelatine in the immediate vicinity thereof. The hardened portions of the gelatine will thus have two properties imparted to them, viz: the ability to absorb and fix certain classes of dyes that do not stain or affect the interposed soft portions of the gelatine; and the property to repel certain other classes of dyes that are capable of being absorbed by and of coloring only said soft portions. After being thus treated, the film is placed in a bath of hyposulphite of soda, for removing all traces of the metallic silver. The resulting film is perfectly clear and transparent, but is composed of distributed areas of hardened and soft gelatine.

The film is then colored by means of suitable dye baths. A blue-green dye composed of Patent Blue A and Tartrazine, will attach itself only to the hardened or tanned portions of the gelatine, while such a dye as Congo Red will attach itself only to the unhardened portions. The film may be treated in a mixed bath of such dyes, and the dyes will go to their respective places.

Almost any desired combination of colors may be used in the treatment described, since, unlike all subtractive processes, this system does not have to make up the blacks of the picture by density of color. Thus two colors may be used that leave a balance of color in the additive whites; for example, a magenta and a blue-green. The two colors, if so desired, may not be more than tints, reminding one of the effect of hand colored prints.

Figure 2:
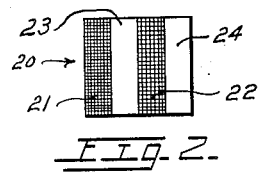
Figure 2 is a negative photograph of this object on a panchromatic film, the blue-greens having been eliminated by means of a color filter.

Instead of producing film 41 in the manner described, use may be made of a double coated film for the purpose. In this case, one emulsion is printed from the red selection negative of which the prototype is shown in Fig. 2, and from the blue-green selection negative, of which the prototype is shown in Fig. 3, in alternate frames. The other emulsion is printed from "dupe" negative 32. Both emulsions are then developed, fixed, and washed in one operation. The emulsion that was printed from film 32 is then subjected to the above described bleaching solution, in such a manner as not to affect the other emulsion. After being thoroughly bleached it is fixed and washed. It may or may not be dried afterward, but it usually is better to do this. This emulsion is then colored by being treated in a bath composed of several suitable dyes of the character, and in the manner indicated above, and is then washed to finish it.

It is not my intention to limit the means for producing my herein described colored film to any particular procedure in its development and coloring, except as set forth in the appended claims. There are many possible variants of the methods and processes described; and these are contemplated by me, and are within the scope of my invention. A composite film can, after having a black and white image printed and developed thereon, be given a protective coating, and thereafter be treated in tanks or tubes of solutions. A variation of this procedure is required only when the dye that attaches to the hardened portions of the gelatine is used after bleaching. This type of dye will not attach itself permanently to the emulsion that bears the black and white image. In such a case the red dye is applied after drying the emulsion it is to color, by any suitable means. This may be accomplished by wiping on from a ribbon, by the use of rollers, or by floating.

Figure 9:
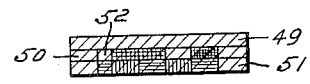
Figure 9 is a cross-section of slightly different type of film, but adapted for the same purposes as the one shown in Fig. 8.

The composite film may be made with the image and colored emulsions on the same side of a transparent base 49 as shown in Fig. 9. In this case the black and white image 50 is next to the base, and the colored layer 51 on the surface. The black and white image is first printed, developed, and locked in, by means of a bath composed of potassium bichromate 12 grammes, potassium bromide 24 grammes, and water 1,000 c. c. s. It is then washed and dried without fixing, in the dark. The top emulsion is then printed from film 32 (Fig. 6), developed, bleached, fixed, and washed. Then the dyes are applied in a mixed bath, and the completed film is washed and dried.

The purpose of the above bi-chromate bath is to lock in the first black and white image 50, so that emulsion 51 may be printed, developed, and toned, without affecting the other. Any bath that is capable of accomplishing this is suitable for the purpose.

As a further variant, it may be suggested that use may be made of a transparent base having two layers of emulsion thereon, separated by a layer of removable color, as described in my co-pending application for color-photography filed April 13, 1929, Ser. No. 354,779.

Sound records may be incorporated in any of the films described, in ways that are well known, space for a sound track being provided at 52. Such a sound record may be protected by the locking means described, and tinting the superposed emulsion does no harm. The sound record may even be red upon a field of blue-green, these colors being sufficiently contrasting.

Figure 10:
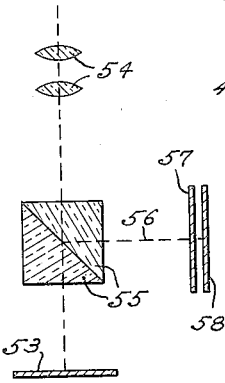
Figure 10 is a specific diagrammatic arrangement of apparatus for producing the results described.

In addition to the methods already described, equivalent results may be secured in the manner illustrated in Fig. 10. In this procedure a black and white image of the object is made upon a panchromatic negative film at 53, through objective lenses 54 and a pair of prisms 55. This may be done without the use of color filters. The reflected image, traversing the path 56, is used to expose two ortho-chromatic emulsions 57 and 58, one of which records the blue-greens of the object, and the other of which records the reds.

A film having alternating records, such as those described, has many advantages that will be appreciated by those familiar with the art. The standard speed of projection with sound is 90 feet per minute, and the taking speed may be the same with alternating records. Where rapid action is present, it is an advantage to make the black and white print from the combined red and blue-green negatives, thus covering up any effects of "fringing" that might otherwise appear. The length of the scene is exactly what is shot.

It will be appreciated that, although the description has been confined for convenience and clarity to a consideration of an object consisting of a mere card with colored stripes thereon, the methods described are applicable to the reproduction by projection of any colored object, no matter how intricate, nor what the color arrangement or character of the colors may be.

Having thus fully described my invention, I claim:

1. A motion picture film comprising; a series of black and white images of a colored object, produced by combined printing of a pair of color-selection negatives made by photographing the said object; and a superposed series of prints in alternate frames made from said negatives respectively, carrying distributed areas in complemental colors; said colored series of prints being formed by removing the deposited silver and coloring the corresponding portions one color, and tinting the other portions another color, said distributed areas being so placed that, when projected upon a screen, they will register with corresponding areas of the black and white pictures.

2. The method of color-photography which consists in making a pair of color selection negatives of a colored object, of which one is minus the red values and the other is minus the blue-green values; making a series of positives on a motion picture film by printing said negatives; superposing upon alternate frames of said series, prints made from a positive print of the red-selection negative, wherein the silver has been eliminated, its place taken by a colored dye, and the remaining portions are toned a complementary color; and superposing upon the other frames of said series, prints made from the blue-green negative, wherein the silver has been similarly eliminated and the emulsion similarly colored; whereby, upon the projection of said film, an image of said object in its natural colors will appear upon the screen, the uncolored portions of said image being due to the additive effect of the complementary colors in corresponding areas of alternate frames of the film.

3. A motion picture film comprising; a black and white positive print made from a pair of color selection negatives, photographed from a colored object; and superposed records of said negatives in alternate frames respectively; one of said records being directly printed from one of said negatives, and the other being printed from a positive of the other said negative; and the exposed portions of said frames being of one color, and their unexposed portions another color.

4. A motion picture film comprising; alternate frames of positive and negative prints made from a pair of color selection negatives; said frames having their exposed portions of one color and their unexposed portions of a substantially complementary color; and said frames being superposed over black and white positive prints made from said color selection negatives.

5. A motion picture film made from a pair of color selection negatives in which pure colors of the taking filters are represented as such in alternate frames made from these negatives respectively; combinations of colors in a picture projected from said film being produced by the additive effect of succeeding frames; and said frames being superposed upon black and white positive prints of the object from which said color selection negatives were photographed.

WILLIAM V. D. KELLEY.